United States Patent
Fan et al.

(10) Patent No.: US 9,718,940 B2
(45) Date of Patent: Aug. 1, 2017

(54) EXTRACTION OF HARMFUL COMPOUNDS FROM MATERIALS CONTAINING SUCH HARMFUL COMPOUNDS

(71) Applicant: GREEN SOURCE ENERGY LLC, Austin, TX (US)

(72) Inventors: Liang-tseng Fan, Manhattan, KS (US); Shahram Reza Shafie, Austin, TX (US)

(73) Assignee: Green Source Energy LLC, Austin, TX (US)

( * ) Notice: Subject to any disclaimer, the term of this patent is extended or adjusted under 35 U.S.C. 154(b) by 88 days.

(21) Appl. No.: 14/030,218

(22) Filed: Sep. 18, 2013

(65) Prior Publication Data

US 2014/0088209 A1    Mar. 27, 2014

Related U.S. Application Data

(60) Provisional application No. 61/703,089, filed on Sep. 19, 2012.

(51) Int. Cl.
*C08J 11/04* (2006.01)
*C08J 7/02* (2006.01)
*C08J 11/02* (2006.01)

(52) U.S. Cl.
CPC .......... *C08J 11/04* (2013.01); *C08J 7/02* (2013.01); *C08J 11/02* (2013.01); *C08J 2319/00* (2013.01)

(58) Field of Classification Search
CPC ........ C08J 11/02; C08J 11/04; C08J 2319/00; C08J 7/02
USPC ................................................. 521/40–49.8
See application file for complete search history.

(56) References Cited

U.S. PATENT DOCUMENTS

| 7,976,241 B2 * | 7/2011 | Hoag ............... B09C 1/08 405/128.1 |
| 2008/0113146 A1 * | 5/2008 | Wright et al. ........... 428/95 |
| 2008/0139678 A1 * | 6/2008 | Fan ............... C08C 19/08 521/43 |
| 2009/0270670 A1 * | 10/2009 | Daugulis ............ B09C 1/00 588/249 |

FOREIGN PATENT DOCUMENTS

JP    2006 087980    *    4/2006

OTHER PUBLICATIONS

Moninot, "PAHs & Carbon Blacks, Technical Issues and Regulatory Update", IOM3, 2010.*
Machine translation of JP 2006 087980, Furukawa et al, Apr. 6, 2006.*
Citrus Burst 1, Material Safety Data Sheet, Florida Chemical Company, Inc., Oct. 2006, 4 pages.
Citrus Burst 2, Material Safety Data Sheet, Florida Chemical Company, Inc., Jul. 2007, 4 pages.
Citrus Burst 3, Material Safety Data Sheet, Florida Chemical Company, Inc., Jul. 2007, 4 pages.
Coppen, J.J.W. and Hone, G.A., Non-Wood Forest Products 2, Gum naval stores: turpentine and rosin from pine resin, Food and Agriculture Organization of the United States, 1985, 71 pages.

* cited by examiner

*Primary Examiner* — Frances Tischler
(74) *Attorney, Agent, or Firm* — Rothwell, Figg, Ernst & Manbeck, P.C.

(57) ABSTRACT

A composition and method for extracting, recovering, removing, and/or reducing at least one harmful compound selected from a harmful polycyclic aromatic hydrocarbon (PAH), bisphenol A (BPA), a harmful phthalate, a harmful polychlorinated biphenyl (PCB), a harmful dioxin, a harmful hexachlorobenzene, or a harmful organotin from a harmful compound-containing material using harmful compound-extracting composition comprising a turpentine fluid.

20 Claims, No Drawings

EXTRACTION OF HARMFUL COMPOUNDS FROM MATERIALS CONTAINING SUCH HARMFUL COMPOUNDS

CROSS REFERENCE TO RELATED APPLICATIONS

This application claims benefit of U.S. provisional application No. 61/703,089 filed on Sep. 19, 2012, all of which is incorporated herein by reference in its entirety for all purposes.

FIELD OF THE INVENTION

The present invention relates to the field of dissolution, extraction, removal and/or reduction of harmful compounds from a material containing harmful compounds.

BACKGROUND OF THE INVENTION

Chemical compounds found in consumer goods, the environment, and materials that humans come into contact with on a regular basis pose a real and increasing threat to humans, animals, plant life, and water supplies. Such harmful compounds include Polycyclic Aromatic Hydrocarbons (PAHs), Bisphenol A (BPA), phthalates, Polychlorinated Biphenyls (PCBs), dioxins, organotins such as dibutyltin (DBT), triphenyltin (TphT), dioctyltin (DOT), hexachlorobenzene ($C_6Cl_6$) and tributyltin (TBT).

PAHs, also known as poly-aromatic hydrocarbons or polynuclear aromatic hydrocarbons, are potent atmospheric pollutants that consist of fused aromatic rings and do not contain heteroatoms or carry substituents. The term polynuclear aromatics is now considered obsolete and is not recognized as valid by either the IUPAC or the ACS. Naphthalene is the simplest example of a PAH. PAHs occur in oil, coal and tar deposits, and are produced as byproducts of fuel burning (whether fossil fuel or biomass). As pollutants, PAHs are of concern because some PAHs have been identified as carcinogenic, mutagenic and teratogenic. PAHs are also found in cooked foods. PAHs in consumer products and foods can originate from various sources including wood stoves and grills, charcoal grills, railroad ties, marine pilings, utility poles, burning trash, diesel engines, extender oils that are added to rubber materials to achieve the desired material properties, and soot, which is added to elastomers to achieve the required properties of the material. Consumers are exposed to PAHs not only by skin contact with consumer products but also through food, inhalation of contaminated air, and tobacco smoke. The Toxicology Section of the German Society for Experimental and Clinical Pharmacology and Toxicology (DGPT) provides estimates of the daily intake of Benzo[a]Pyrene (BaP) (as the reference compound for PAH mixtures) amongst others as follows: dietary intake 0.2 up to 0.5 μg and inhalation from tobacco smoke 0.4 μg. The World Health Organization (WHO) indicates an average daily intake for the general population of 0.001-0.005 μg/kg bodyweight. The Scientific Committee on Food (SCF) indicates a maximum daily intake of 0.42 μg/person, which approximately corresponds to 0.006 μg per kg bodyweight.

Studies have shown that high levels of PAHs are found, for example, in meat cooked at high temperatures such as grilling or barbecuing, and in smoked fish. PAHs were evaluated by the International Programme on Chemical Safety (IPCS), the Scientific Committee on Food (SCF) and by the Joint FAO/WHO Expert Committee on Food Additives (JECFA). SCF concluded that 15 PAHs, namely benz[a]anthracene, benzo[b]fluoranthene, benzo[j]fluoranthene, benzo[k]fluoranthene, benzo[ghi]perylene, benzo[a]pyrene, chrysene, cyclopenta[cd]pyrene, dibenz[a,h]anthracene, dibenzo[a,e]pyrene, dibenzo[a,h]pyrene, dibenzo[a,i]pyrene, dibenzo[a,l]pyrene, indeno[1,2,3-cd]pyrene and 5-methylchrysene show clear evidence of mutagenicity/genotoxicity in somatic cells in experimental animals in vivo and, with the exception of benzo[ghi]perylene, have also shown clear carcinogenic effects in various types of bioassays in experimental animals.

Polycyclic aromatic hydrocarbons are lipophilic, meaning they mix more easily with oil than water. The larger compounds are less water-soluble and less volatile. Because of these properties, PAHs in the environment are found primarily in soil, sediment and oily substances, as opposed to in water or air. However, they are also a component of concern in particulate matter suspended in air.

Natural crude oil and coal deposits contain significant amounts of PAHs, arising from chemical conversion of natural product molecules, such as steroids, to aromatic hydrocarbons. They are also found in processed fossil fuels, tar and various edible oils.

PAHs are one of the most widespread organic pollutants. In addition to their presence in fossil fuels they are also formed by incomplete combustion of carbon-containing fuels such as wood, coal, diesel, fat, tobacco, and incense. Different types of combustion yield different distributions of PAHs in both relative amounts of individual PAHs in which isomers are produced. Thus, coal burning produces a different mixture than motor-fuel combustion or a forest fire, making the compounds potentially useful as indicators of the burning history. Hydrocarbon emissions from fossil fuel-burning engines are regulated in developed countries. Used motor oils contain a significant concentration of PAHs.

PAHs generally have two or more fused or bridged aromatic rings. Smaller aromatic molecules, such as benzene and toluene, are not PAHs.

PAHs containing five- or six-membered rings are most common. PAHs composed only of six-membered rings are called alternant PAHs. Certain alternant PAHs are called benzenoid PAHs. These can be benzene rings interconnected with each other by single carbon-carbon bonds and with no rings remaining that do not contain a complete benzene ring.

PAHs containing up to six fused aromatic rings are often known as "small" PAHs, and those containing more than six aromatic rings are called "large" PAHs. Due to the availability of samples of the various small PAHs, the bulk of research on PAHs has been of those of up to six rings. The biological activity and occurrence of the large PAHs does appear to be a continuation of the small PAHs. They are found as combustion products, but at lower levels than the small PAHs due to the kinetic limitation of their production through addition of successive rings. In addition, with many more isomers possible for larger PAHs, the occurrence of specific structures is much smaller.

Naphthalene ($C_{10}H_8$), which consists of two coplanar six-membered rings sharing an edge, is another aromatic hydrocarbon. By formal convention, it is not a true PAH, though is referred to as a bicyclic aromatic hydrocarbon.

EU REACH Annex XVII has placed a restriction on the use of 8 PAHs in tires and extender oil. Tires will not be allowed to be placed on EU market if 8 PAHs exceed certain concentration thresholds listed in the following table. The restriction also applies to the marketing of tires in EU.

| Name | CAS | Structure | Limits |
| --- | --- | --- | --- |
| Benzo[a]pyrene | 50-32-8 | 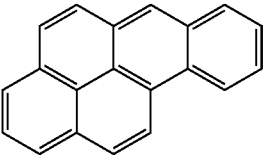 [SMILES: c1ccc2c(c1)cc1ccc3cccc4ccc2c1c34] | 1 mg/kg |
| Benzo[e]pyrene | 192-97-2 | 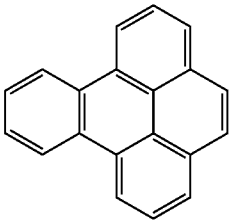 [SMILES: c1ccc2c(c1)c1cccc3ccc4cccc2c4c31] | |
| Benzo[a]anthracene | 56-55-3 | 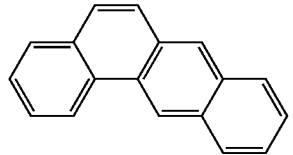 [SMILES: c1ccc2cc3c(ccc4ccccc43)cc2c1] | Sum of 8 PAHs <10 mg/kg |
| Chrysene | 218-01-9 | 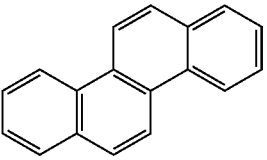 [SMILES: c1ccc2c(c1)ccc1c3ccccc3ccc21] | REACH has designated ISO 21461 as standard testing method for 8 PAHs in tire. |
| Benzo[b]fluoranthene | 205-99-2 | 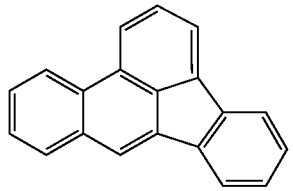 [SMILES: c1ccc2c(c1)-c1cccc3c1c-2cc1ccccc13] | For extender oil, IP346 is used |
| Benzo[k]fluoranthene | 207-08-9 | 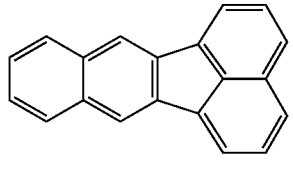 [SMILES: c1ccc2cc3c(cc2c1)-c1cccc2cccc-3c12] | According to the ISO 21461, tires are compliant with the restriction on |
| Benzo[j]fluorant | 205-82-3 | 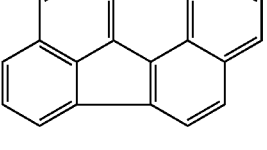 | PAHs if the concentration of vulcanizates compound is not greater than 0.35% of Bay proton's limit. |
| Dibenzo[a,h]anthrancene | 53-70-3 | 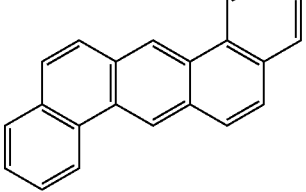 | |

In addition to the EU restriction of 8 PAHs in tire and extender oil, Germany has decided on the mandatory Polycyclic Aromatic Hydrocarbons (16 PAHs) testing for the GS-certification process. The U.S. EPA has restricted 18 PAHs in consumer goods.

The limits for PAHs that must be met for materials of consumer goods are stated in the following table:

| | Parameter | | |
|---|---|---|---|
| | Category 1<br>Material in contact with foodstuff, or materials intended to be put in the mouth and toys for children age of <36 months | Category 2<br>Materials with foreseeable contact to skin for longer than 30 seconds (long-term skin contact) and toys not covered by category 1 | Category 3<br>Materials with foreseeable contact to skin up to 30 seconds (short term skin contact) or without skin contact |
| Benzo(a)pyrene mg/kg | Not detectable(<0.2) | 1 | 20 |
| Sum 18 PAHs (EPA) mg/kg | Not detectable(<0.2) | 10 | 200 |

A variety of technologies have been used to remove PAHs from various materials. Nevertheless, there remains a need for a PAH removal method that is commercially viable, that does not negatively affect the properties of the PAH-containing material, and is environmentally safe and effective at mild conditions.

U.S. Pat. No. 4,879,049 relates to a process of removing polycyclic aromatic hydrocarbons (PAH) by pre-coat vacuum filtration by forming a slurry and passing the slurry though a filter.

U.S. Pat. No. 5,045,206 relates to a process in which multi-ring aromatic hydrocarbons and/or toxins are selectively solvent-extracted from hydrocarbon feed streams by contacting the aromatics and/or toxins containing hydrocarbon stream with one side of a porous, non-selective partition barrier membrane while simultaneously contacting the other side of the membrane with an aromatics selective extraction solvent whereby the multi-ring aromatic hydrocarbons and/or toxins selectively migrate through the porous partition barrier membrane in response to the selective solvent. A preferred extraction solvent is ethylenediamine.

U.S. Pat. No. 5,880,325 relates to a process in which aromatic hydrocarbons are selectively extracted from lube oil stocks comprising mixtures of the same with non-aromatic hydrocarbons using tetramethyl sulfoxide as the extraction solvent. The oils so extracted are the heavier oils, i.e., those boiling above about 200° C. and identified as being at least lube base stock grade 60N and higher.

U.S. Pat. No. 6,923,915 relates to a process of purifying carbon nanomaterials, including fullerenes and fullerenic soot, using O-xylene, toluene, and o-dichlorobenzene, using a multiphase extraction process.

U.S. Pat. No. 7,118,906 relates to a process for removing three-ringed and/or four-ringed polycyclic aromatic hydrocarbons from sites contaminated therewith using white-rot lignin modifying fungus strain *Flavodon flavus* NRRL 30302.

U.S. Application No: 2011/0159160 relates to a process of removing PAHs using a low polarity medium by contacting the medium with the molecularly imprinted polymer.

Bisphenol A (BPA) and phthalates are organic compounds that are poorly soluble in water and have been used to make plastics for decades. Such plastics have been used to make food and drink packaging, e.g., water and infant bottles, and other consumer goods including adhesives and glues, electronics, agricultural adjuvants, building materials, personal-care products, medical devices, detergents and surfactants, packaging, children's toys, modeling clay, waxes, paints, printing inks and coatings, pharmaceuticals, food products, and textiles, compact discs, impact-resistant safety equipment, and medical devices. Other sources include epoxy resins used as lacquers to coat metal products such as food cans, bottle tops, and water supply pipes. Some dental sealants and composites may also contain BPA and/or phthalates. Bisphenol A is a weak endocrine disruptor, which can mimic estrogen and may lead to negative health effects including obesity, neurological issues, thyroid function, cancer, reproductive system and genital changes, miscarriages, and heart disease. Phthalates and phthalate esters are used as plasticizers in a large variety of products, from enteric coatings of pharmaceutical pills and nutritional supplements to viscosity control agents, gelling agents, film formers, stabilizers, dispersants, lubricants, binders, emulsifying agents, and suspending agents. Phthalates have been shown to change hormone levels and linked to birth defects, cancer, endocrine disruption, obesity, and metabolic problems. BPA and phthalates are easily released into the environment because there is no covalent bond between the phthalates and plastics in which they are mixed.

Polychlorinated Biphenyls (PCBs) belong to a broad family of man-made organic chemicals known as chlorinated hydrocarbons. In the United States, PCBs were domestically manufactured from 1929 until their manufacture was banned in 1979. They have a range of toxicity and vary in consistency from thin, light-colored liquids to yellow or black waxy solids. Due to their non-flammability, chemical stability, high boiling point, and electrical insulating properties, PCBs were used in hundreds of industrial and commercial applications including electrical, heat transfer, and hydraulic equipment; as plasticizers in paints, plastics, and rubber products; in pigments, dyes, and carbonless copy paper; and many other industrial applications.

Products that may contain PCBs include: transformers and capacitors, other electrical equipment including voltage regulators, switches, reclosers, bushings, and electromagnets, oil used in motors and hydraulic systems, old electrical devices or appliances containing PCB capacitors, fluorescent light ballasts cable insulation, thermal insulation material including fiberglass, felt, foam, and cork, adhesives, tapes, oil-based paint, caulking, plastics, carbonless copy paper, and floor finish.

Once in the environment, PCBs do not readily break down and therefore may remain for long periods of time cycling between air, water, and soil. PCBs can be carried long distances and have been found in snow and sea water in areas far away from where they were released into the environment. As a consequence, PCBs are found all over the world. In general, the lighter the form of PCB, the further it can be transported from the source of contamination. PCBs can accumulate in the leaves and above-ground parts of plants and food crops. They are also taken up into the bodies of small organisms and fish. As a result, people who ingest fish may be exposed to PCBs that have bioaccumulated in the fish they are ingesting. PCBs have been demonstrated to cause cancer, as well as a variety of other adverse health effects on the immune system, reproductive system, nervous system, and endocrine system.

Dioxins are environmental pollutants. They have the dubious distinction of belonging to the "dirty dozen"—a group of dangerous chemicals known as persistent organic pollutants. Dioxins are of concern because of their highly toxic potential. The highest environmental concentrations of dioxin are usually found in soil and sediment, with much lower levels found in air and water. Experiments have shown they affect a number of organs and systems. Once dioxins have entered the body, they endure a long time because of their chemical stability and their ability to be absorbed by fat tissue, where they are then stored in the body. Their half-life in the body is estimated to be seven to eleven years. In the environment, dioxins tend to accumulate in the food chain. The higher in the animal food chain one goes, the higher the concentration of dioxins.

The chemical name for dioxin is: 2,3,7,8-tetrachlorodibenzo para dioxin (TCDD). The name "dioxins" is often used for the family of structurally and chemically related polychlorinated dibenzo para dioxins (PCDDs) and polychlorinated dibenzofurans (PCDFs). Certain dioxin-like polychlorinated biphenyls (PCBs) with similar toxic properties are also included under the term "dioxins". Some 419 types of dioxin-related compounds have been identified but only about 30 of these are considered to have significant toxicity, with TCDD being the most toxic.

Dioxins are mainly by products of industrial processes but can also result from natural processes, such as volcanic eruptions and forest fires. Dioxins are unwanted by products of a wide range of manufacturing processes including smelting, chlorine bleaching of paper pulp and the manufacturing of some herbicides and pesticides. In terms of dioxin release into the environment, uncontrolled waste incinerators (solid waste and hospital waste) are often the worst culprits, due to incomplete burning. Technology is available that allows for controlled waste incineration with low emissions.

Although formation of dioxins is local, environmental distribution is global. Dioxins are found throughout the world in the environment. The highest levels of these compounds are found in some soils, sediments and food, especially dairy products, meat, fish and shellfish. Very low levels are found in plants, water and air.

Extensive stores of PCB-based waste industrial oils, many with high levels of PCDFs, exist throughout the world. Long-term storage and improper disposal of this material may result in dioxin release into the environment and the contamination of human and animal food supplies. PCB-based waste is not easily disposed of without contamination of the environment and human populations. Such material needs to be treated as hazardous waste.

In July 2007, the European Commission issued a health warning to its Member States after high levels of dioxins were detected in a food additive—guar gum—used as thickener in small quantities in meat, dairy, dessert or delicatessen products. The source was traced to guar gum from India that was contaminated with pentachlorophenol (PCP), a pesticide no longer in use. PCP contains dioxins as contamination.

In 1999, high levels of dioxins were found in poultry and eggs from Belgium. Subsequently, dioxin-contaminated animal-based food (poultry, eggs, pork), were detected in several other countries. The cause was traced to animal feed contaminated with illegally disposed PCB-based waste industrial oil.

In March 1998, high levels of dioxins in milk sold in Germany were traced to citrus pulp pellets used as animal feed exported from Brazil. The investigation resulted in a ban on all citrus pulp imports to the EU from Brazil.

Another case of dioxin contamination of food occurred in the United States of America in 1997. Chickens, eggs, and catfish were contaminated with dioxins when a tainted ingredient (bentonite clay, sometimes called "ball clay") was used in the manufacture of animal feed. The contaminated clay was traced to a bentonite mine. As there was no evidence that hazardous waste was buried at the mine, investigators speculate that the source of dioxins may be natural, perhaps due to a prehistoric forest fire.

Short-term exposure of humans to high levels of dioxins may result in skin lesions, such as chloracne and patchy darkening of the skin, and altered liver function. Long-term exposure is linked to impairment of the immune system, the developing nervous system, the endocrine system and reproductive functions. Chronic exposure of animals to dioxins has resulted in several types of cancer. TCDD was evaluated by the WHO's International Agency for Research on Cancer (IARC) in 1997. Based on animal data and on human epidemiology data, TCDD was classified by IARC as a "known human carcinogen."

Due to the omnipresence of dioxins, all people have background exposure and a certain level of dioxins in the body, leading to the so-called body burden. Current normal background exposure is not expected to affect human health on average. However, due to the high toxic potential of this class of compounds, efforts need to be undertaken to reduce current background exposure.

Hexachlorobenzene is a fungicide that was used as a seed treatment until it was banned globally under the Stockholm Convention on persistent organic pollutants. It was also used in the production of rubber, aluminum, and dyes and in wood preservation. Hexachlorobenzene is formed as a byproduct during the manufacture of other chemicals. Chronic oral exposure to hexachlorobenzene in humans results in a liver disease with associated skin lesions. Animal studies have reported cancer of the liver, thyroid, and kidney from oral exposure to hexachlorobenzene. Studies have also shown hexachlorobenzene to be associated with diabetes.

Organotins are highly toxic and widely distributed environmental chemicals. Dibutyltin (DBT) is used as stabilizer in the production of polyvinyl chloride plastics, and it is also the major metabolite formed from tributyltin (TBT) in vivo. DBT is immunotoxic, however, the responsible targets remain to be defined. Due to the importance of glucocorticoids in immune-modulation, we investigated whether DBT could interfere with glucocorticoid receptor (GR) function.

The most abundant organotin in the environment is tributyltin (TBT), a molluscicide and fungicide widely used as an antifouling paint for boat and fish nets, and thus is dispersed into the marine environment. TBT interferes with reproduction in marine animals, inducing imposex (superimposition of male sexual characters in females) in gastropod mollusks, an effect used to measure TBT pollution in sea-water. In vivo, TBT is mainly metabolized to DBT in the liver, involving cytochrome P450 enzymes. n-Butyltin trichloride is used in the production of tin dioxide layers on glass bottles by chemical vapor deposition. Tributyltin oxide has been extensively used as a wood preservative. Uses include wood preservation, antifouling pesticide in marine paints, antifungal action in textiles and industrial water systems, such as cooling tower and refrigeration water systems, wood pulp and paper mill systems, and breweries.

Tributyltin oxide is the most widely used compound in TBT-containing commercial products. Tributyltin compounds are moderately to highly persistent organic pollutants that biomagnify up the marine predators' food net. One common example is leaching of TBT from marine paints into the aquatic environment, causing irreversible damage to the aquatic life. Tributyltin has also been linked to obesity in humans, as it triggers genes that cause the growth of fat cells. TBT compounds are also used as marine anti-biofouling agents. Concerns over toxicity of TBT and TPT compounds (some reports describe biological effects to marine life at a concentration of 1 nanogram per liter) have led to a worldwide ban by the International Maritime Organization.

Triorganotins are very toxic. Tri-n-alkyltins are phytotoxic and therefore cannot be used in agriculture. Depending on the organic groups, they can be powerful bactericides and fungicides. Tributyltins are used as industrial biocides, e.g., as antifungal agents in textiles and paper, wood pulp and paper mill systems, breweries, and industrial cooling systems. Tributyltins are also used in marine anti-fouling paint. Triphenyltins are used as active components of antifungal paints and agricultural fungicides. Other triorganotins are used as miticides and acaricides. Organotin compounds are used commercially in a wide range of applications such as biocides, insecticides, chemical intermediates and as catalysts.

Environmental concentrations of TBT and TPT vary depending upon how, when and where compounds are used. Up to 1.58 µg/l (sea water) and 7.1 µg/l (fresh water) of TBT, and nearly 200 ng/l of TPT have been detected in some bay areas or marinas with many boats treated with organotin-based antifouling-paints.

TBT and TPT are sparingly soluble in water and easily adsorbed to particulate matter in the aquatic environment. Hence they are accumulated in sediment where they are relatively persistent and are taken up by the benthic organisms such as clams. TBT and TPT are accumulated in fish and other aquatic organisms with bioconcentration factors of $10^2$-$10^4$.

TPT and TBT produce various health effects in laboratory mammals, including effects on the immune system, such as decreases in immunoglobulin concentrations, lymphopenia, and thymus or splenic atrophy in rats and mice, reproductive/developmental effects Due to the health risks associated with the class of harmful compounds, there was a need to reduce levels of such harmful compounds that has been met by the invention described herein.

SUMMARY OF INVENTION

In accordance with one embodiment of the present invention, a method for dissolution, extraction, removal and/or reduction of harmful compounds from a material that contains one or more harmful compounds, includes the steps of providing a harmful compound-extracting fluid including a turpentine fluid and contacting the harmful compound-containing material with the harmful compound-extracting fluid such that an extraction mixture is formed, as well as residual material. The extraction mixture contains at least a portion of the harmful compound from the harmful compound-containing material and the turpentine fluid. The residual material includes non-soluble material from the harmful compound-containing material. The residual material can also include a reduced portion of harmful compound-containing matter in the circumstance where all such harmful compound-containing material has not been solubilized by the turpentine fluid and moved into the extraction mixture. The residual material is then separated from the extraction mixture. The extraction mixture is further separated into a first portion and a second portion. The first portion of the extraction mixture includes a hydrocarbon product stream that includes at least a portion of the harmful compound-containing materials extracted from the harmful compound-containing material. The second portion of the extraction mixture includes at least a portion of the turpentine fluid. In one embodiment, substantially all of the turpentine fluid is recovered in the recycle or recovered stream.

In one embodiment, the harmful compound is one or more of Polycyclic Aromatic Hydrocarbons (PAHs), Bisphenol A (BPA), phthalates, Polychlorinated Biphenyls (PCBs), dioxins, organotins such as dibutyltin (DBT), triphenyltin (TphT), dioctyltin (DOT), hexachlorobenzene, or tributyltin (TBT).

In another embodiment, substantially all harmful compound(s) in the harmful compound-containing material is extracted into the extraction mixture. In such embodiment, the residual materials are essentially free of harmful compound(s) such as PAHs and can be used or disposed of without impact to the environment.

In accordance with one embodiment of the invention, the invention provides a method for removing a harmful compound and/or harmful compound-associated compound that are contained in harmful compound-containing materials such as water, soil, air, a gas, oils, plants, wood, fats, rubber, plastics, consumer goods, raw materials, or any other type of material or other medium that contains harmful compounds. The method includes the steps of providing a harmful compound-extracting fluid containing one or more turpentine fluids such that a recovery mixture is formed, as well as residual material. The recovery mixture contains at least a portion of the harmful compounds that were dissolved, emulsified, or trapped within the harmful compound-containing material. The residual material includes non-soluble material from the harmful compound-containing material. The residual material can be totally free or include a reduced portion of the harmful compound in the circumstance where all such harmful compound has not been solubilized by the harmful compound-extracting fluid. The residual material is then separated from the recovery mixture. The recovery mixture is further separated into a first portion and a second portion. The first portion of the recovery mixture includes a harmful compound stream that includes at least a portion of the harmful compound extracted from the harmful compound-containing material. The second portion of the recovery mixture includes at least a portion of the turpentine fluid. In one embodiment, substantially all of the harmful compound(s) are recovered in the recovery mixture.

In another embodiment, the invention provides a composition for removing harmful compound(s) and associated compounds that are contained in a harmful compound-containing material.

DETAILED DESCRIPTION OF THE INVENTION

In one aspect, the present invention relates to a readily deployed composition for the dissolution, extraction, removal or reduction of at least one harmful compound from a harmful compound-containing material.

According to one embodiment, a method is provided including the steps of dissolving, extracting, recovering, removing, and/or reducing at least one harmful compound from a harmful compound-containing material. As used herein, a "harmful compound" is a compound selected from Polycyclic Aromatic Hydrocarbons (PAHs), Bisphenol A (BPA), phthalates, Polychlorinated Biphenyls (PCBs), dioxins, organotins such as dibutyltin (DBT), triphenyltin (TphT), dioctyltin (DOT), hexachlorobenzene, or tributyltin (TBT). Examples of harmful compound-containing materials are water, soil, air, a gas, oils, plants, wood, fats, rubber, plastics, consumer goods, raw materials, or any other type of material or other medium that contains harmful compounds including the materials listed in the background section. Dissolving, extracting, recovering, removing, and/or reducing at least one harmful compound from a harmful compound-containing material includes the step of providing a harmful compound-extracting composition comprising, consisting essentially of, or consisting of turpentine fluid and contacting the harmful compound-containing material with the harmful compound-extracting composition such that an extraction mixture is formed, as well as a harmful compound-reduced or harmful compound-free residual material.

According to the present invention, the quantity of harmful compound contained within the harmful compound-containing material is substantially reduced. At least one species of harmful compound is reduced according to the inventive method. In one embodiment, the harmful compound to be reduced or eliminated from the harmful compound-containing material is a harmful compound identified as being associated with health and safety risks. For example, the harmful compound may be carcinogenic, immunogenic, mutagenic, teratogenic, reprotoxic and/or an irritant. As used herein, the term "harmful PAHs" refers to one or more PAH compounds having carcinogenic, immunogenic, mutagenic, teratogenic, reprotoxic and/or irritant characteristics. Similarly, as used herein, the term "harmful organotin" refers to one or more organotin compounds having carcinogenic, immunogenic, mutagenic, teratogenic, reprotoxic and/or irritant characteristics. Similarly, as used herein, the term "harmful phthalate" refers to one or more phthalate compounds having carcinogenic, immunogenic, mutagenic, teratogenic, reprotoxic and/or irritant characteristics. Similarly, as used herein, the term "harmful PCB" refers to one or more polychlorinated biphenyl compounds having carcinogenic, immunogenic, mutagenic, teratogenic, reprotoxic and/or irritant characteristics. Similarly, as used herein, the term "harmful dioxin" refers to one or more dioxin compounds having carcinogenic, immunogenic, mutagenic, teratogenic, reprotoxic and/or irritant characteristics. As used herein, the term "harmful hexachlorobenzene" refers to one or more hexachlorobenzene compounds having carcinogenic, immunogenic, mutagenic, teratogenic, reprotoxic and/or irritant characteristics.

In one embodiment, the invention includes a method of treating a harmful compound-containing material that contains levels of one or more harmful compounds, alone or in combination, that violate standards set by one or more regulatory agencies as acceptably safe, such that the level of the one or more harmful compounds are reduced from an unacceptably high level to below an acceptably safe threshold level as set by regulations. For example, the method involves reducing levels of one or more PAHs selected from benz[a]anthracene, benzo[b]fluoranthene, benzo[j]fluoranthene, benzo[k]fluoranthene, benzo[ghi]perylene, benzo[a]pyrene, chrysene, cyclopenta[cd]pyrene, dibenz[a,h]anthracene, dibenzo[a,e]pyrene, dibenzo[a,h]pyrene, dibenzo[a,i]pyrene, dibenzo[a,l]pyrene, indeno[1,2,3-cd]pyrene, or 5-methylchrysene, in order to comply with European Union Scientific Committee for Food regulations for acceptably low levels of PAHs.

The following table lists the names and structures of some PAHs frequently monitored according to recommendations by the EU Scientific Committee for Food Safety (SCF), the European Union (EU) and the U.S. Environmental Protection Agency (EPA).

| List | Common Name | Structure |
|---|---|---|
| EPA, SCF, EU | Benzo[a]pyrene | |
| EPA | Acenaphthene | |
| EPA | Acenaphthylene | |
| EPA | Anthracene | |
| EPA, SCF, EU | Benzo[a]anthracene | |
| EPA, SCF, EU | Benzo[b]fluoranthene | |
| SCF, EU | Benzo[j]fluoranthene | |
| EPA, SCF, EU | Benzo[k]fluoranthene | |

| List | Common Name | Structure |
|---|---|---|
| EU | Benzo[c]fluorene | 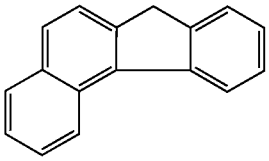 [SMILES: c1ccc2c(c1)Cc1ccc3ccccc3c1-2] |
| EPA, SCF, EU | Benzo[ghi]perylene | 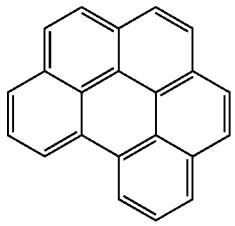 [SMILES: c1cc2ccc3ccc4ccc5cccc6c(c1)c2c3c4c56] |
| EPA, SCF, EU | Chrysene | 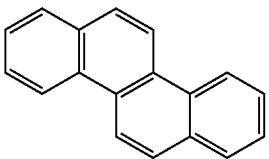 [SMILES: c1ccc2c(c1)ccc1c3ccccc3ccc21] |
| SCF, EU | Cyclopenta[cd]pyrene | 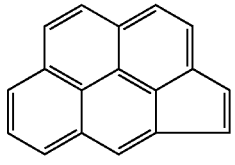 [SMILES: C1=Cc2cc3cccc4ccc5ccc1c2c5c43] |
| EPA, SCF, EU | Dibenzo[a,h]anthracene | 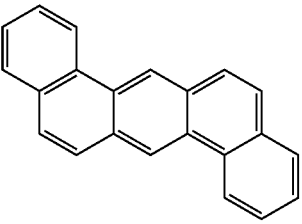 [SMILES: c1ccc2c(c1)ccc1cc3c(ccc4ccccc43)cc12] |
| EU + SCF | Dibenzo[a,e]pyrene | 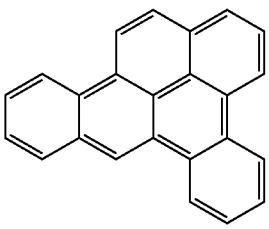 [SMILES: c1ccc2c(c1)cc1c3ccccc3c3cccc4ccc2c1c43] |
| EU + SCF | Dibenzo[a,h]pyrene | 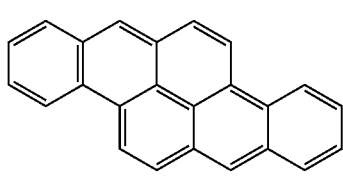 [SMILES: c1ccc2c(c1)cc1ccc3c4ccccc4cc4ccc2c1c43] |
| EU + SCF | Dibenzo[a,i]pyrene | 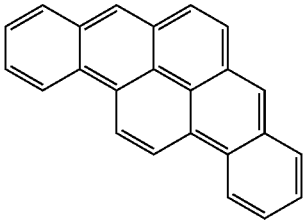 [SMILES: c1ccc2c(c1)cc1ccc3cc4ccccc4c4ccc2c1c34] |
| EU + SCF | Dibenzo[a,l]pyrene | 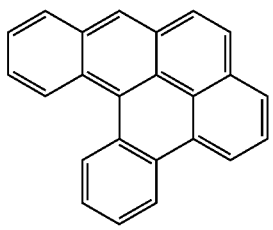 [SMILES: c1ccc2c(c1)cc1ccc3cccc4c5ccccc5c2c1c34] |
| EPA | Fluoranthene | 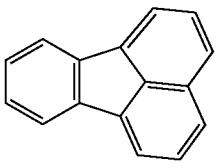 [SMILES: c1ccc2c(c1)-c1cccc3cccc-2c13] |
| EPA | Fluorene | 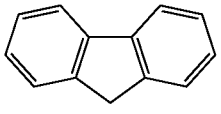 [SMILES: c1ccc2c(c1)Cc1ccccc1-2] |
| EPA, SCF, EU | Indeno[1,2,3-cd]pyrene | 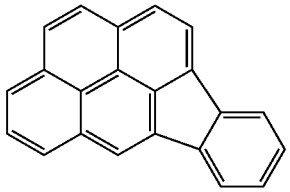 [SMILES: c1ccc2c(c1)-c1ccc3ccc4cccc5cc-2c1c3c45] |
| EU + SCF | 5-Methyl chrysene | 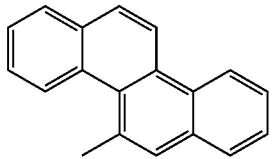 [SMILES: Cc1cc2ccccc2c2ccc3ccccc3c12] |
| EPA | Naphthalene | 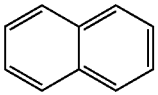 |
| EPA | Phenanthrene | 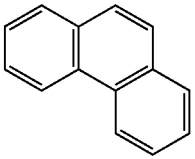 [SMILES: c1ccc2c(c1)ccc1ccccc12] |

-continued

| List | Common Name | Structure |
|------|-------------|-----------|
| EPA | Pyrene | 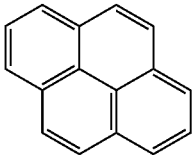 [SMILES: c1cc2ccc3cccc4ccc(c1)c2c34] |

PAHs that can be removed using the invention include, but are not limited to the PAHs listed in the following table.

| PAH | # of Rings | # of Benzene Rings |
|-----|------------|---------------------|
| Acenaphthene | 3 | 2 |
| Acenaphthylene | 3 | 2 |
| Anthracene | 3 | 3 |
| Benzo[a]anthracene | 4 | 4 |
| Benzo[a]pyrene | 5 | 5 |
| Benzo[e]pyrene | 5 | 5 |
| Benzo[b]fluoranthene | 5 | 4 |
| Benzo[ghi]perylene | 6 | 6 |
| Benzo[j]fluoranthene | 5 | 4 |
| Benzo[k]fluoranthene | 5 | 4 |
| Benzo[c]fluorene | 4 | 3 |
| Chrysene | 4 | 4 |
| Cyclopenta[cd]pyrene | 5 | 4 |
| Dibenzo(a,h)anthracene | 5 | 5 |
| Dibenzo[a,e]pyrene | 6 | 6 |
| Dibenzo[a,h]pyrene | 6 | 6 |
| Dibenzo[a,i]pyrene | 6 | 6 |
| Dibenzo[a,l]pyrene | 6 | 6 |
| Fluoranthene | 3 | 4 |
| Fluorene | 3 | 2 |
| Indeno[1,2,3-cd]pyrene | 6 | 5 |
| 5-Methylchrysene | 4 | 4 |
| Naphthalene | 2 | 2 |
| Phenanthrene | 3 | 3 |
| Pyrene | 4 | 4 |

For example, the method involves reducing levels of one or more organotin compounds. The European Union Regulation Commission has banned the use of tri-substituted organostannic compounds such as TBT compounds and TPT compounds after Jul. 1, 2010, in articles where the concentration in the article, or part thereof, is greater than the equivalent of 0.1% by weight of tin.

The European Union Regulation Commission has also banned the use of DBT compounds after Jan. 1, 2012, in mixtures and articles for supply to the general public where the concentration in the mixture or the article, or part thereof, is greater than the equivalent of 0.1% by weight of tin.

The European Union Regulation Commission has also banned the use of Dioctyltin (DOT) compounds Jan. 1, 2012, in the following articles for supply to, or use by, the general public, where the concentration in the article, or part thereof, is greater than the equivalent of 0.1% by weight of tin: textile articles intended to come into contact with the skin, gloves, footwear or part of footwear intended to come into contact with the skin, wall and floor coverings, childcare articles, female hygiene products, nappies, and two-component room temperature vulcanization molding kits (RTV-2 molding kits).

Triphenyltin compounds are organotin compounds with the general formula $(C_6H_5)_3SnX$. They contain the triphenyltin group, $(C_6H_5)_3Sn$, or $Ph_3Sn$, which consists of an atom of tin bonded to three phenyl groups. Examples of triphenyltins include: Triphenyltin hydride, $Ph_3SnH$, Triphenyltin hydroxide, $Ph_3SnOH$, Triphenyltin chloride, $Ph_3SnCl$, Triphenyltin acetate, $Ph_3SnOAc$.

Tributyltin compounds are a group of compounds containing the $(C_4H_9)_3Sn$ moiety, such as tributyltin hydride or tributyltin oxide. The EPA has released a final ambient water quality criteria document for tributyltin (TBT), which is found at water.epa.gov/scitech/swguidance/standards/criteria/aqlife/pollutants/tributyltin/upload/2004_01_05_criteria_tributyltin_tbt-final.pdf and is incorporated herein by reference in its entirety. Generally, the one-hour average concentration of TBT should not exceed 0.46 µg/L more than once every three years on the average (acute criterion) and the four-day average concentration of TBT should not exceed 0.072 µg/l more than once every three years on the average (chronic criterion) in order to protect freshwater aquatic life. Further, the one-hour average concentration of TBT should not exceed 0.42 µg/L more than once every three years on the average (acute criterion) and the four-day average concentration of TBT should not exceed 0.0074 µg/L more than once every three years on the average (chronic criterion) in order to protect saltwater aquatic life.

Thus, in one embodiment, the invention includes a method of treating an organotin-containing material that contains levels of one or more organotins, alone or in combination, that violate standards set by one or more regulatory agencies, e.g., the EU Commission, as acceptably safe, such that the level of the one or more organotins are reduced from an unacceptably high level to below an acceptably safe threshold level as set by regulations.

In one embodiment, the invention includes a method of removing bisphenol A (BPA) and/or phthalates from a BPA and/or phthalate-containing material. For example, the BPA and/or phthalate-containing material is a plastic to be recycled. The method involves contacting the BPA and/or phthalate-containing material with a BPA and/or phthalate-extracting fluid containing an effective amount of a turpentine fluid to extract, remove, and/or reduce the BPA and/or phthalates from the BPA and/or phthalate-containing material such that a recovery mixture is formed, as well as residual material. The recovery mixture contains at least a portion of the BPA and/or phthalates that were in the BPA and/or phthalate-containing material. The residual material includes material that is not dissolved into the turpentine fluid. The residual material can be totally free or include a reduced portion of the BPA and/or phthalates in the circumstance where all such BPA and/or phthalates have not been solubilized by the BPA and/or phthalate-extracting fluid. The residual material is then separated from the recovery mixture. The recovery mixture is further separated into a first portion and a second portion. The first portion of the recovery mixture includes a BPA and/or phthalate stream that includes at least a portion of the BPA and/or phthalate extracted from the BPA and/or phthalate-containing material.

In one embodiment, the invention includes a method of removing hexachlorobenzene from a hexachlorobenzene-containing material. For example, the hexachlorobenzene-containing material is rubber, fungicide, soil or water. The method involves contacting the hexachlorobenzene-containing material with a hexachlorobenzene-extracting fluid containing an effective amount of a turpentine fluid to extract, remove, and/or reduce the hexachlorobenzene from the hexachlorobenzene-containing material such that a recovery mixture is formed, as well as residual material. The recovery mixture contains at least a portion of the hexachlorobenzene that was in the hexachlorobenzene-containing material. The residual material includes material that is not dissolved into the turpentine fluid. The residual material can be totally free or include a reduced portion of the hexachlorobenzene in the circumstance where all such hexachlorobenzene has not been solubilized by the hexachlorobenzene-extracting fluid. The residual material is then separated from the recovery mixture. The recovery mixture is further separated into a first portion and a second portion. The first portion of the recovery mixture includes a hexachlorobenzene stream that includes at least a portion of the hexachlorobenzene extracted from the hexachlorobenzene-containing material.

In one embodiment, at least one harmful compound is dissolved, extracted, recovered, or removed using a PAH-extracting composition. The harmful compound-extracting composition contains one or more turpentine fluids selected from natural turpentine, synthetic turpentine, mineral turpentine, pine oil, alpha-pinene, beta-pinene, alpha-terpineol, beta-terpineol, gamma-terpineol, 3-carene, anethole, dipentene (p-mentha-1,8-diene), terpene resins, alpha-terpene, beta-terpene, gamma terpene, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, or mixtures thereof. In certain embodiments, the harmful compound-extracting composition comprises, consists essentially of, or consists of a turpentine fluid having more than eight carbon atoms. In certain embodiments, the harmful compound-extracting composition comprises, consists essentially of, or consists of a turpentine fluid having nine, ten, or more than ten carbon atoms. In certain embodiments, the harmful compound-extracting composition comprises, consists essentially of, or consists of a synthetic turpentine fluid or a blend of synthetic turpentine fluids. The turpentine fluid may be a liquid, vapor, gas, supercritical fluid, or a combination thereof.

In one embodiment, the harmful compound-extracting composition contains one or more acyclic or cyclic alcohols. For example, the alcohols can be simple alcohols such as methanol (methyl alcohol), ethanol (ethyl alcohol), propanol (propyl alcohol), isopropanol, butanol, isobutanol, pentanol and its eight more isomers (1-Pentanol, 3-Methyl-1-butanol, 2-Methyl-1-butanol, 2,2-Dimethyl-1-propanol, 3-Pentanol, 2-Pentanol, 3-Methyl-2-butanol, 2-Methyl-2-butanol) and hexanol and its sixteen more isomers (1-Hexanol, 2-Hexanol, 3-Hexanol, 2-Methyl-1-pentanol, 3-Methyl-1-pentanol, 4-Methyl-1-pentanol, 2-Methyl-2-pentanol, 3-Methyl-2-pentanol, 4-Methyl-2-pentanol, 2-Methyl-3-pentanol, Tertiary 3-Methyl-3-pentanol, Primary 2,2-Dimethyl-1-butanol, 2,3-Dimethyl-1-butanol, 3,3-Dimethyl-1-butanol, 2,3-Dimethyl-2-butanol, 3,3-Dimethyl-2-butanol, 2-Ethyl-1-butanol), lower aliphatic alcohols, or a mixture thereof. In certain embodiments, the alcohol is methanol (methyl alcohol), ethanol (ethyl alcohol), propanol (propyl alcohol), isopropanol, butanol, isobutanol, pentanol, hexanol, or a mixture thereof. In another embodiment, the harmful compound-extracting composition contains no acyclic or cyclic alcohol.

As used herein, the term "lower aliphatic alcohols" refers to primary, secondary and tertiary monohydric and polyhydric alcohols of between 2 and 12 carbon atoms. As used herein, the term alkanes refers to straight chain and branched chain alkanes of between 5 and 22 carbon atoms. As used herein, the term aromatics refers to monocyclic, heterocyclic and polycyclic compounds. As used herein, "aliphatic amines" refers to primary, secondary and tertiary amines having alkyl substituents of between 1 and 15 carbon atoms.

In another embodiment, the harmful compound-extracting composition further contains an organic compound with a hydroxyl functional group, e.g., benzene, toluene, hexane and xylene, or a mixture thereof. In some embodiments, the PAH-extracting composition contains no organic compound with a hydroxyl functional group, e.g., no benzene, toluene, hexane, and xylene.

In yet another embodiment, the harmful compound-extracting composition contains a second fluid selected from Dimethyl sulfoxide (DMSO) (also termed as Dimethyl sulfoxide, Methyl sulfoxide, or Methylsulfinylmethane), CELLOSOLVE™ (also termed as 2-Ethoxyethanol, Ethylene glycol, Ethyl ether, Oxitol, or EthylCellosolve), alkanes, aromatics, aliphatic amines, aromatic amines, carbon bisulfide, vegetable oils, solvents manufactured in petroleum refining, dry distilling coal, fractionating liquefied coal, and fractionating extracted hydrocarbons from oil sands and oil shale, or a mixture thereof.

In certain embodiments, the ratio of turpentine fluid in the harmful compound-extracting composition to the second fluid is greater than or equal to about 1:1 by volume. In one embodiment, the ratio of turpentine fluid in the harmful compound-extracting composition to the second fluid is greater than or equal to about 3:1 by volume.

In another embodiment, the ratio of turpentine fluid in the harmful compound-extracting composition to the second fluid is between about 1:5 to about 5:1 by volume. In one embodiment, the ratio of turpentine fluid in the harmful compound-extracting composition to the second fluid is between about 1:2 to about 2:1 by volume.

In one embodiment, the harmful compound-extracting composition contains at least about 10% alcohol, toluene, methylene chloride, or a mixture thereof. In another embodiment, the turpentine-extracting composition contains at least about 30% alcohol, toluene, methylene chloride, or a mixture thereof. In another embodiment, the harmful compound-extracting composition contains up to about 50% alcohol, toluene, methylene chloride, or a mixture thereof. In another embodiment, the method involves not contacting the harmful compound-containing material with any alcohol, toluene, or methylene chloride.

In one embodiment, the quantity of the harmful compound contained within the harmful compound-containing material is reduced by at least about 10% and up to about 100%. In one embodiment, the quantity of the harmful compound contained within the harmful compound-containing material is reduced by at least about 50%. In one embodiment, the quantity of the harmful compound contained within the harmful compound-containing material is reduced by at least about 75%. In one embodiment, the quantity of the harmful compound contained within the harmful compound-containing material is reduced by about 100%.

In certain embodiments, the concentration of at least one harmful compound or the sum total quantity of a selected group of harmful compounds in a harmful compound-containing material is reduced from an unacceptably high level to an acceptably low level, e.g., to meet regulatory guidelines, which reduction step is herein referred to as "satisfactorily reducing" the level of harmful compound. These guidelines are well-known to a person skilled in the art. For example, the level of one or more PAHs is reduced to less than 200 mg/kg, 20 mg/kg, 10 mg/kg, 5 mg/kg, 1 mg/kg, 0.5 mg/kg, or 0.2 mg/kg by weight of the PAH-containing material. In certain embodiments, the level of one or more PAHs is reduced to below a detectable level.

As used herein, the term "substantially reduces" shall mean that the amount of at least one harmful compound contained in the harmful compound-containing material is reduced by at least about 50%.

As used herein, the term "sufficiently reduces" shall mean that the amount of at least one harmful compound contained in the harmful compound-containing material is reduced to below a relevant regulatory level for the material that is being treated, for example, for PAHs, below 10 mg/kg or below 0.2 mg/kg. Similarly, for organotins, below 0.1%.

As used herein, the term "devulcanized recycle rubber" refers to scrap rubber that has been obtained for recycling purposes and has been devulcanized for this purpose.

The harmful compound-extracting composition is said to consist essentially of the turpentine fluid if the turpentine fluid is the essential active ingredient for substantially all of the harmful compound-extraction and the other ingredients in the composition are essentially inactive or non-active in extracting harmful compounds. Thus, in certain embodiments, the basic and novel characteristics of the present invention include a composition consisting essentially of a turpentine fluid that excludes other active harmful compound-extracting ingredients.

As used herein, the term "non-active" shall mean that the ingredient is not present in an effective active amount for harmful compound extraction.

In another embodiment, the inventive composition is substantially non-aqueous or the method involves contacting said material with a substantially non-aqueous harmful compound-extracting composition. In one embodiment the harmful compound-extracting composition is non-aqueous.

In certain embodiments, one or more surfactants may be added to the harmful compound-extracting composition. Yet in other embodiments, the harmful compound-extracting composition is surfactant-free or substantially surfactant-free.

In certain embodiments, the ratio of the harmful compound-extracting composition to harmful compound-containing material is in a range of about 1:6 to about 6:1 by weight, or in a range of about 1:2 to about 4:1 by weight. In another embodiment the ratio of the harmful compound-extracting composition to the harmful compound-containing material is in a range of about 1:1 to about 3:1 by weight.

In other embodiments, the amount of the harmful compound-extracting composition used is about 10 to about 2500 wt. % of the harmful compound-containing material. In certain embodiments, the amount of the harmful compound-extracting composition used is about 30 to about 200 wt. % of the harmful compound-containing material. In other embodiments, the amount of the harmful compound-extracting composition used is about 50 to about 150 wt. % of the harmful compound-containing material. In one embodiment, the amount of the harmful compound-extracting composition used is about 100 wt. % of the harmful compound-containing material.

In one embodiment, the harmful compound-containing material is selected from one or more materials that contain levels of harmful compound that are unacceptably high and are in need of reduction. For example, the harmful compound-containing material may be devulcanized rubber or rubber that has not been vulcanized. In one embodiment, the harmful compound-containing material is rubber that has not been devulcanized by the method disclosed in U.S. Pat. No. 7,767,722. In another embodiment, the harmful compound-containing material may be fabrics, wastewater, groundwater, seawater, tobacco products and harmful compound(s) formed from lighted tobacco products, carbon black, wood, coal, diesel, vegetable oil and fats, animal oils and fats, soil, capacitors, electrical devices, adhesives, biocides, paints, coatings, soaps, detergents, pesticides, herbicides, fungicides, fertilizers, coal-tar seal coatings, used motor oil, or incense. In particular, the harmful compound-containing material may be a consumer good or raw material for manufacturing a consumer good, e.g., plastics, elastomers, rubber, lacquers, varnishes, paints, lubricants, antirust oils, leather and coatings. Examples of consumer goods are a shoe, a boot, a sandal, a recycled tire, athletic equipment, clothing, a playground surface material, playground equipment, a wetsuit, a cable or wire sheath, rubber mulch, an office supply, office equipment, an office furnishing, a sports field surface, a sports track material, a glove, a backpack, luggage, a floor mat, a floor covering, bedding, a tobacco product, a tool handle, bicycle handles, stroller handles, a steering wheel or steering wheel cover, a gear-shift knob, a plastic toy, a bicycle handlebar, a watch strap, a toy, a videogame controller, a mobile device, a mobile device cover or protector, a water recreational device a water flotation device, scuba diving equipment, a scuba mask, snorkeling equipment, a scuba fin, swimming goggles, a swim cap, a shower cap, a toothbrush handle, camping gear, a strap, a rain suit, an adhesive, a glue, an agricultural adjuvant, a building material, a personal-care product, a medical device, a surfactants, packaging, modeling clay, a wax, printing ink, a pharmaceutical, a food product, a textile, a compact disc, impact-resistant safety equipment, a lacquer to coat metal products such as food cans, bottle tops, and water supply pipes, a dental sealant, transformers, capacitors, voltage regulators, switches, reclosers, bushings, and electromagnets, used hydraulic oil, fluorescent light ballasts, cable insulation, fiberglass, felt, foam, cork, caulking, carbonless copy paper, floor finish, contaminated soil or water, an electronic and electrical device, and a food container.

In certain embodiments, the invention is directed to the recycle of rubber. Such a method involves obtaining devulcanized or never-before vulcanized rubber containing one or more harmful compounds at unacceptably high levels, reducing the levels of harmful compound in the devulcanized rubber or non-vulcanized rubber to satisfactorily low levels according to the method described above, separating the harmful compound-extracting composition from the devulcanized or never-before vulcanized rubber, optionally further treating the devulcanized or never-before vulcanized rubber with one or more washing steps using alcohols or organic compounds, then vulcanizing or revulcanizing the rubber for use as a recycled rubber product.

In certain embodiments, the invention is directed to the recycle of motor oil. Such a method involves obtaining used motor oil containing one or more harmful compounds at unacceptably high levels, reducing the levels of harmful compound in the used motor oil to satisfactorily low levels according to the method described above, separating the harmful compound-extracting composition from the used motor oil, then performing further processing steps to convert the harmful compound-reduced motor oil into a useful recycled product that has reduced harmful compound levels compared to conventional recycled motor oil and recycled products conventionally made from used motor oil.

In certain embodiments, the dissolution, removal, reduction and/or extraction of harmful compounds can be carried out at a temperature within the range of about 2° C. to about 400° C. In certain embodiments, the harmful compound-containing material is contacted with the harmful compound-extracting composition at a temperature of less than about 280° C., or less than about 160° C. In other embodiments, the contacting temperatures can be within the range of about 15° C. to about 150° C.

In certain embodiments, it has surprisingly been found that PAHs are extracted most effectively and efficiently at a contacting temperature between about 90° C. to about 120° C.

The contacting step for dissolution, removal, recovery, and/or reduction of the levels of harmful compound in the harmful compound-containing material can involve one or more steps including mixing, stirring, in-line static mixing, dipping, submerging, and/or any other means of contacting the PAH-containing material with the harmful compound-extracting composition.

The contacting step can occur over a period of about 1 to about 300 minutes. In one embodiment, the contacting step can occur over a period of about 5 to about 60 minutes, at a pressure between about 1 and about 10 atm.

In certain embodiments, it has surprisingly been found that PAHs are extracted most effectively and efficiently, e.g., from rubber, over a contacting period between about 10 minutes to about 90 minutes, particularly between about 20 minutes to about 60 minutes. The contacting step may be repeated once or multiple times. For example, the contacting step may be repeated 1 to 10 times. The extraction of harmful compound from a harmful compound-containing material can be monitored over time by various methods including, but not limited to High Resolution, Single-Column Gas Chromatography (GC-FID), Multi-Dimensional Gas Chromatography (GC-FID), Gas Chromatography-Mass Spectrometry (GC-MS), Fluorescent Indicator Absorption (FIA), High Performance Liquid Chromatography (HPLC), Gas Chromatography-Fourier Transform Infrared Spectroscopy (GC-FTIR), Supercritical Fluid Chromatography (SFC), Nuclear Magnetic Resonance Spectroscopy (NMR), and/or Clay-Gel Absorption Chromatography. Thus, in one embodiment, a harmful compound-containing material may be treated with the harmful compound-extracting composition and monitored so as to determine the contacting time necessary to reduce the levels of harmful compound(s) in the harmful compound-containing material to acceptable levels.

After contacting the harmful compound-containing material with the harmful compound-extracting composition, the resultant material, which has reduced levels of harmful compound, is separated from the harmful compound-extracting composition. Separation can occur through any suitable means including, but not limited to, vacuum or pressure filtration, and/or gravity separation. After one or more separation steps, the resultant material which has reduced levels of harmful compound(s) may be further processed to remove the harmful compound-extracting composition by washing the resultant material with one or more acyclic or cyclic alcohols. For example, the alcohol can be simple alcohols such as methanol (methyl alcohol), ethanol (ethyl alcohol), propanol (propyl alcohol), isopropanol, butanol, isobutanol, pentanol and its eight more isomers (1-Pentanol, 3-Methyl-1-butanol, 2-Methyl-1-butanol, 2,2-Dimethyl-1-propanol, 3-Pentanol, 2-Pentanol, 3-Methyl-2-butanol, 2-Methyl-2-butanol) and hexanol and its sixteen more isomers (1-Hexanol, 2-Hexanol, 3-Hexanol, 2-Methyl-1-pentanol, 3-Methyl-1-pentanol, 4-Methyl-1-pentanol, 2-Methyl-2-pentanol, 3-Methyl-2-pentanol, 4-Methyl-2-pentanol, 2-Methyl-3-pentanol, Tertiary 3-Methyl-3-pentanol, Primary 2,2-Dimethyl-1-butanol, 2,3-Dimethyl-1-butanol, 3,3-Dimethyl-1-butanol, 2,3-Dimethyl-2-butanol, 3,3-Dimethyl-2-butanol, 2-Ethyl-1-butanol), lower aliphatic alcohols, or a mixture thereof. In certain embodiments, the alcohol is methanol (methyl alcohol), ethanol (ethyl alcohol), propanol (propyl alcohol), isopropanol, butanol, isobutanol, pentanol, hexanol, or a mixture thereof. The washing step or washing steps may also include contacting the treated material with an organic compound with a hydroxyl functional group, for example, benzene, toluene, hexane and xylene, or a mixture thereof to remove the harmful compound-extracting composition.

The turpentine fluid can be separated from the harmful compound-extracting composition via any suitable means including, but not limited to, flash evaporation or distillation. Any turpentine fluid extracted into the acyclic or cyclic alcohols may be separated therefrom via any suitable means including, but not limited to, flash evaporation or distillation.

In one embodiment, the invention includes a method of obtaining a consumer good having reduced levels of at least one harmful compound by obtaining a consumer good or a raw material for manufacturing a consumer good having an unacceptably high level of at least one harmful compound, providing a harmful compound-extracting composition comprising a turpentine fluid, contacting said a consumer good or a raw material for manufacturing a consumer good having an unacceptably high level of at least one harmful compound with said harmful compound-extracting composition such that a reduced-harmful compound material and an extraction mixture are formed, the extraction mixture comprising at least a portion of at least one harmful compound extracted into the turpentine fluid, separating the extraction mixture from the reduced-harmful compound material, and using the reduced-harmful compound material as a consumer good or as a raw material for manufacturing a consumer good. The consumer good may be any suitable material including, but not limited to, a shoe, boot, sandal, tire, or tire part. The raw material may be any suitable material including, but not limited to, devulcanized recycle rubber, plastic, coal-tar, or carbon black. In certain embodiments, the contacting may occur for about 15 to about 90 minutes at about 60° C. to about 140° C.

In certain embodiments, after optionally processing the resultant material by contacting it with one or more acyclic or cyclic alcohols, the material, now having reduced levels of harmful compound(s), may be used as a consumer good or as a raw material for producing a consumer good. For example, the invention includes a method of producing a shoe, boot, or sandal by obtaining devulcanized rubber or non-vulcanized rubber for use as a recycled product, reducing the levels of harmful compound in the devulcanized rubber or non-vulcanized rubber to satisfactorily low levels according to the method described above, separating the harmful compound-extracting composition from the devulcanized rubber to satisfactorily low levels, optionally further treating the devulcanized rubber with one or more washing steps using alcohols, then vulcanizing or revulcanizing the rubber and using it to manufacture a shoe, boot, or sandal according to industry practices for doing so. The invention also includes a method of producing a recycled tire or retread tire by reducing levels of harmful compound in devulcanized rubber or non-vulcanized rubber to satisfactorily low levels according to the method described above, separating the harmful compound-extracting composition from the treated rubber to satisfactorily low levels, optionally further treating the rubber with one or more washing steps using alcohols, then vulcanizing or revulcanizing the rubber and using it to manufacture a recycled tire or to retread a tire.

In certain embodiments, the ratio of the harmful compound-extracting composition to a harmful compound-containing fabric is between about 0.1:1 to about 3:1, about 0.5:1 to about 2:1, or about 1:1. In other embodiments, the ratio of the harmful compound-extracting composition to a harmful compound-containing devulcanized or non-vulcanized rubber is between about 0.1:1 to about 10:1, about 0.5:1 to about 6:1, about 2:1 to about 5:1, or about 4:1.

According to an aspect of the present invention, the harmful compound-containing material is contacted with a heterogeneous fluid including a harmful compound-extracting composition. In other embodiments, the harmful compound-containing material is contacted with a homogeneous, one-phase fluid. The homogeneous, one-phase fluid can comprise, consist essentially of, or consist of the harmful compound-extracting composition.

Various standardized methods for determining the level of harmful compounds such as PAHs have been developed by regulatory agencies worldwide. The ISO 21461 method provides for the selective determination of polyaromaticity of oil in vulcanized rubber compounds. The method is based on Nuclear Magnetic Resonance (NMR) Spectrometry. Specifically, the rubber material is cut into small pieces and is extracted using acetone for 8 hours in a soxhlet apparatus. After drying by a stream of nitrogen, the dried extract is dissolved in methylene chloride. The methylene chloride is subjected to a clean-up step by means of solid phase extraction. The dried, non-polar eluate of the solid phase extract is analyzed by NMR spectrometry to determine the percentage of Bay Region Hydrogens (% Hbay), which gives an indication of the aromaticity of the used oil. Directive 2005/69/EC provides that a vulcanized rubber compound may be placed on the market for the production of tires or parts of tires if the % Hbay is below 0.35%.

In the ZEK method for determining the level of PAHs, which was developed in Germany and has been adopted in Europe, 500 mg of sample is cut into particles 2-3 mm in size, and placed in an ultrasonic bath at a temperature of 60° C. for one hour with 20 mL of toluene mixed with internal standards: Standard 1: naphthalene-d8; Standard 2: pyrend10, anthracene-d10, or phenanthrene-d10; Standard 3: benzo(a)pyrene-d12, perylene-d12, or triphenylbenzene. After cooling to room temperature, an aliquot is taken from the extract and quantified using a gas chromatograph with a mass specific detector (GC-MSD) in the SIM method. Category 1 materials must have total sum of harmful PAH levels<0.2 mg/kg (undetectable) and benzo[a]pyrene levels<0.2 mg/kg (undetectable), Category 2 materials must have total sum of harmful PAH levels<10 mg/kg and benzo[a]pyrene levels<1 mg/kg, and Category 3 materials must have total sum of harmful PAH levels<200 mg/kg and benzo[a]pyrene levels<10 mg/kg. A Category 1 material is material intended to be put in the mouth or material for toys with normal skin contact for children aged<36 months. A Category 2 material is material not included within Category 1, but with predictable contact with skin for longer than 30 seconds. A Category 3 material is material not included within Categories 1 or 2, but with predictable contact with skin for up to 30 seconds.

The U.S. EPA has developed various methods for determining PAH levels including EPA 8100, 8310, and 8270D. Method 8100 is used to determine the concentration of certain PAHs. Compounds that may be determined by this method are: Acenaphthene, Acenaphthylene, Anthracene, Benzo(a)anthracene, Benzo(a)pyrene, Benzo(b)fluoranthene, Benzo(j)fluoranthene, Benzo(k)fluoranthene, Benzo(ghi)perylene, Chrysene, Dibenz(a,h)acridine, Dibenz(a,j)acridine, Dibenzo(a,h)anthracene, 7H-Dibenzo(c,g)carbazole, Dibenzo(a,e)pyrene, Dibenzo(a,h)pyrene, Dibenzo(a,i)pyrene, Fluoranthene, Fluorene, Indeno(1,2,3-cd)pyrene, 3-Methylcholanthrene, Naphthalene, Phenanthrene, and Pyrene. The methods for such testing have been published by the EPA and are available at www.epa.gov/osw/hazard/testmethods/sw846/pdfs/8100.pdf, which is incorporated herein by reference in its entirety.

Method 8310 is used to determine the concentration of certain PAHs in ground water and wastes. Specifically, Method 8310 is used to detect the following substances: Acenaphthene, Acenaphthylene, Anthracene, Benzo(a)anthracene, Benzo(a)pyrene, Benzo(b)fluoranthene, Benzo(ghi)perylene, Benzo(k)fluoranthene, Chrysene, Dibenzo(a,h)anthracene, Fluoranthene, Fluorene, Indeno(1,2,3-cd)pyrene, Naphthalene, Phenanthrene, and Pyrene. The methods for such testing have been published by the EPA and are available at www.epa.gov/osw/hazard/testmethods/sw846/pdfs/8310.pdf, which is incorporated herein by reference in its entirety.

Method 8270D is used to determine the concentration of semivolatile organic compounds in extracts prepared from many types of solid waste matrices, soils, air sampling media and water samples. The methods for such testing have been published by the EPA and are available at www.epa.gov/osw/hazard/testmethods/sw846/pdfs/8270d.pdf, which is incorporated herein by reference in its entirety.

In another embodiment, the invention includes a method of removing bisphenol A (BPA) and/or phthalates from a BPA and/or phthalate-containing material. BPA has a structure of

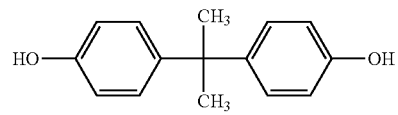

and phthalates have a core structure of

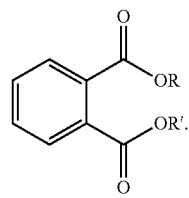

Some common phthalates are listed in the following table:

| Name | Abbreviation | Structural formula | CAS No. |
|---|---|---|---|
| Dimethyl phthalate | DMP | $C_6H_4(COOCH_3)_2$ | 131-11-3 |
| Diethyl phthalate | DEP | $C_6H_4(COOC_2H_5)_2$ | 84-66-2 |
| Diallyl phthalate | DAP | $C_6H_4(COOCH_2CH=CH_2)_2$ | 131-17-9 |
| Di-n-propyl phthalate | DPP | $C_6H_4[COO(CH_2)_2CH_3]_2$ | 131-16-8 |
| Di-n-butyl phthalate | DBP | $C_6H_4[COO(CH_2)_3CH_3]_2$ | 84-74-2 |
| Diisobutyl phthalate | DIBP | $C_6H_4[COOCH_2CH(CH_3)_2]_2$ | 84-69-5 |

-continued

| Name | Abbreviation | Structural formula | CAS No. |
|---|---|---|---|
| Butyl cyclohexyl phthalate | BCP | $CH_3(CH_2)_3OOCC_6H_4COOC_6H_{11}$ | 84-64-0 |
| Di-n-pentyl phthalate | DNPP | $C_6H_4[COO(CH_2)_4CH_3]_2$ | 131-18-0 |
| Dicyclohexyl phthalate | DCP | $C_6H_4[COOC_6H_{11}]_2$ | 84-61-7 |
| Butyl benzyl phthalate | BBP | $CH_3(CH_2)_3OOCC_6H_4COOCH_2C_6H_5$ | 85-68-7 |
| Di-n-hexyl phthalate | DNHP | $C_6H_4[COO(CH_2)_5CH_3]_2$ | 84-75-3 |
| Diisohexyl phthalate | DIHxP | $C_6H_4[COO(CH_2)_3CH(CH_3)_2]_2$ | 146-50-9 |
| Diisoheptyl phthalate | DIHpP | $C_6H_4[COO(CH_2)_4CH(CH_3)_2]_2$ | 41451-28-9 |
| Butyl decyl phthalate | BDP | $CH_3(CH_2)_3OOCC_6H_4COO(CH_2)_9CH_3$ | 89-19-0 |
| Di(2-ethylhexyl) phthalate | DEHP, DOP | $C_6H_4[COOCH_2CH(C_2H_5)(CH_2)_3CH_3]_2$ | 117-81-7 |
| Di(n-octyl) phthalate | DNOP | $C_6H_4[COO(CH_2)_7CH_3]_2$ | 117-84-0 |
| Diisooctyl phthalate | DIOP | $C_6H_4[COO(CH_2)_5CH(CH_3)_2]_2$ | 27554-26-3 |
| n-Octyl n-decyl phthalate | ODP | $CH_3(CH_2)_7OOCC_6H_4COO(CH_2)_9CH_3$ | 119-07-3 |
| Diisononyl phthalate | DINP | $C_6H_4[COO(CH_2)_6CH(CH_3)_2]_2$ | 28553-12-0 |
| Di(2-Propyl Heptyl) phthalate | DPHP | $C_6H_4[COOCH_2CH(CH_2CH_2CH_3)(CH_2)_4CH_3]_2$ | 53306-54-0 |
| Diisodecyl phthalate | DIDP | $C_6H_4[COO(CH_2)_7CH(CH_3)_2]_2$ | 26761-40-0 |
| Diundecyl phthalate | DUP | $C_6H_4[COO(CH_2)_{10}CH_3]_2$ | 3648-20-2 |
| Diisoundecyl phthalate | DIUP | $C_6H_4[COO(CH_2)_8CH(CH_3)_2]_2$ | 85507-79-5 |
| Ditridecyl phthalate | DTDP | $C_6H_4[COO(CH_2)_{12}CH_3]_2$ | 119-06-2 |
| Diisotridecyl phthalate | DIUP | $C_6H_4[COO(CH_2)_{10}CH(CH_3)_2]_2$ | 68515-47-9 |

In one embodiment, the invention includes a method of removing BPA and/or phthalates from a plastic to be recycled. The method involves contacting the BPA and/or phthalate-containing material, e.g., plastics including polyvinyl chloride (PVC), with a BPA and/or phthalate-extracting fluid containing an effective amount of a turpentine fluid to extract, remove, and/or reduce the BPA and/or phthalates from the BPA and/or phthalate-containing material such that a recovery mixture is formed, as well as residual material. The recovery mixture contains at least a portion of the BPA and/or phthalates that were in the BPA and/or phthalate-containing material. The residual material includes material that is not dissolved into the turpentine fluid. The residual material can be totally free or include a reduced portion of the BPA and/or phthalates in the circumstance where all such BPA and/or phthalates have not been solubilized by the BPA and/or phthalate-extracting fluid. The residual material is then separated from the recovery mixture. The recovery mixture is further separated into a first portion and a second portion. The first portion of the recovery mixture includes a BPA and/or phthalate stream that includes at least a portion of the BPA and/or phthalate extracted from the BPA and/or phthalate-containing material. A method and composition for recycling plastics is described in WO 2012/033742, which is incorporated herein by reference in its entirety.

Still other aspects and advantages of the present invention will become easily apparent by those skilled in the art from this description, wherein certain embodiments of the invention are shown and described simply by way of illustration of the best mode contemplated of carrying out the invention. As will be realized, the invention is capable of other and different embodiments, and its several details are capable of modifications in various obvious respects, without departing from the invention. Accordingly, the description is to be regarded as illustrative in nature and not as restrictive.

EXAMPLES

Example 1: Removal of Harmful PAHs—Test 1

Crumb rubber samples were tested according to the EPA 8270D method for removal of PAHs by an independent NELAP accredited laboratory. For PAH level determination, the samples were subjected to 3 minute ultrasonic extraction with methylene chloride at room temperature and then the levels of PAHs were obtained using GC-MSD. As a control, a sample of untreated crumb rubber was found to contain:

| Name of PAH | Concentration (mg/kg) |
|---|---|
| Acenaphthene | BRL |
| Acenaphthylene | 0.105 |
| Anthracene | BRL |
| Benzo[a]anthracene | BRL |
| Benzo[a]pyrene | BRL |
| Benzo[b]fluoranthene | BRL |
| Benzo[ghi]perylene | BRL |
| Benzo[k]fluoranthene | BRL |
| Chrysene | 0.237 |
| Dibenzo[a,h]anthracene | BRL |
| Fluoranthene | 0.625 |
| Fluorene | BRL |
| Indeno[1,2,3-cd]pyrene | BRL |

-continued

| Name of PAH | Concentration (mg/kg) |
|---|---|
| Naphthalene | 0.092 |
| Phenanthrene | 0.45 |
| Pyrene | 1.76 |
| TOTAL | 3.269 |
| Detection (Reporting) Limit | 0.083 |

BRL = Below Reporting Limit

Crumb rubber was mixed with a blend of turpentine fluids containing α-terpineol, β-terpineol, and β-pinene at 90° C. for 20 minutes. The crumb rubber was then separated from the turpentine fluids blend and was tested by the same EPA method. No detectable concentration of any of the PAHs was found in the treated sample. The detection limit was 0.332.

Example 2: Removal of Harmful PAHs—Test 2

A different batch of crumb rubber samples from those tested in Example 1 was tested according to the ZEK method for removal of PAHs by the same independent NELAP accredited laboratory as in Example 1. For PAH level determination, the samples were subjected to 1 hour ultrasonic extraction with toluene at 60° C.

A first test sample of crumb rubber was mixed with a blend of turpentine fluids containing α-terpineol, β-terpineol, and β-pinene at 90° C. for 20 minutes. A second test sample of crumb rubber was mixed with a blend of turpentine fluids containing α-terpineol, β-terpineol, and β-pinene at 120° C. for 60 minutes. For each sample, crumb rubber was then separated from the turpentine fluids blend and was tested by the same ZEK method. The concentrations of PAHs in a sample of crumb rubber before and after treatment are tabulated below. As is clear from the data, no detectable concentration of any of the PAHs was found in either treated sample.

| Name of PAH | Concentration (mg/kg) Before Treatment | Concentration (mg/kg) After Treatment |
|---|---|---|
| Acenaphthene | BRL | BRL |
| Acenaphthylene | BRL | BRL |
| Anthracene | BRL | BRL |
| Benzo[a]anthracene | BRL | BRL |
| Benzo[a]pyrene | BRL | BRL |
| Benzo[b]fluoranthene | BRL | BRL |
| Benzo[ghi]perylene | BRL | BRL |
| Benzo[k]fluoranthene | BRL | BRL |
| Chrysene | BRL | BRL |
| Dibenzo[a,h]anthracene | BRL | BRL |
| Fluoranthene | BRL | BRL |
| Fluorene | BRL | BRL |
| Indeno[1,2,3-cd]pyrene | BRL | BRL |
| Naphthalene | BRL | BRL |
| Phenanthrene | BRL | BRL |
| Pyrene | 10.4 | BRL |
| TOTAL | 10.4 | 0 |
| Detection (Reporting) Limit | 1.584 | 1.287 |

Example 3: Removal of Harmful PAHs—Test 3

A different batch of crumb rubber samples from those tested in Examples 1-2 was tested according to the ZEK method for removal of PAHs by the same independent NELAP accredited laboratory as in Examples 1 and 2. For PAH level determination, the samples were subjected to 1 hour ultrasonic extraction with toluene at 60° C.

A first test sample of the crumb rubber was mixed with a blend of turpentine fluids containing α-terpineol, β-terpineol, and β-pinene at 90° C. for 20 minutes. A second test sample of crumb rubber was mixed with a blend of turpentine fluids containing α-terpineol, β-terpineol, and β-pinene at 120° C. for 60 minutes. For each sample, crumb rubber was then separated from the turpentine fluids blend and was tested by the same ZEK method. As is clear from the table below, no detectable concentration of any of the PAHs was found in either treated sample.

| Name of PAH | Concentration (mg/kg) Before Treatment | Concentration (mg/kg) After Treatment at 90° C. for 20 minutes | Concentration (mg/kg) After Treatment at 120° C. for 60 minutes |
|---|---|---|---|
| Acenaphthene | BRL | BRL | BRL |
| Acenaphthylene | BRL | BRL | BRL |
| Anthracene | BRL | BRL | BRL |
| Benzo[a]anthracene | BRL | BRL | BRL |
| Benzo[a]pyrene | BRL | BRL | BRL |
| Benzo[b]fluoranthene | BRL | BRL | BRL |
| Benzo[ghi]perylene | BRL | BRL | BRL |
| Benzo[k]fluoranthene | BRL | BRL | BRL |
| Chrysene | BRL | BRL | BRL |
| Dibenzo[a,h]anthracene | BRL | BRL | BRL |
| Fluoranthene | 2.3 | BRL | BRL |
| Fluorene | BRL | BRL | BRL |
| Indeno[1,2,3-cd]pyrene | BRL | BRL | BRL |
| Naphthalene | BRL | BRL | BRL |
| Phenanthrene | BRL | BRL | BRL |
| Pyrene | 7.7 | BRL | BRL |
| TOTAL | 10.0 | 0 | 0 |
| Detection (Reporting) Limit | 0.495 | 0.495 | 0.495 |

Example 4: Removal of Harmful PAHs—Test 4

A different batch of crumb rubber samples from those tested in Examples 1-3 was tested according to the ZEK method for removal of PAHs. These sample measurements were performed by a different independent A2LA accredited and ISO 9001:2008 registered laboratory as further independent verification of the unexpected results described above. For PAH level determination, the samples were subjected to one hour ultrasonic extraction with toluene at 60° C. A control sample of untreated crumb rubber, a first test sample of the crumb rubber that was mixed with a blend of turpentine fluids containing α-terpineol, β-terpineol, and β-pinene at 90° C. for 20 minutes, and a second test sample of crumb rubber that was mixed with a blend of turpentine fluids containing α-terpineol, β-terpineol, and β-pinene at 120° C. for 60 minutes, were each tested by the same method. For each test sample, the crumb rubber was then separated from the turpentine fluids blend. The samples were each tested by the same ZEK method and the results of this testing is tabulated below:

| Name of PAH | Control Sample Concentration (mg/kg) | First Test Sample Concentration (mg/kg) | Second Test Sample Concentration (mg/kg) |
| --- | --- | --- | --- |
| Acenaphthene | BRL | BRL | BRL |
| Acenaphthylene | BRL | BRL | BRL |
| Anthracene | BRL | BRL | BRL |
| Benzo[a]anthracene | BRL | BRL | BRL |
| Benzo[a]pyrene | BRL | BRL | BRL |
| Benzo[b]fluoranthene | BRL | BRL | BRL |
| Benzo[ghi]perylene | BRL | BRL | BRL |
| Benzo[k]fluoranthene | BRL | BRL | BRL |
| Chrysene | BRL | BRL | BRL |
| Dibenzo[a,h]anthracene | BRL | BRL | BRL |
| Fluoranthene | 2.4 | 0.6 | 0.5 |
| Fluorene | BRL | BRL | BRL |
| Indeno[1,2,3-cd]pyrene | BRL | BRL | BRL |
| Naphthalene | BRL | BRL | BRL |
| Phenanthrene | 1.2 | 0.2 | 0.2 |
| Pyrene | 8 | 2 | 1.8 |
| TOTAL | 11.6 | 2.8 | 2.5 |
| Detection (Reporting) Limit | ≤0.2 | ≤0.2 | ≤0.2 |

Example 5: Removal of Harmful PAHs—Test 5

A different batch of crumb rubber samples from those tested in Examples 1-4 was tested according to the EPA 8270D method for removal of PAHs by the same independent A2LA accredited and ISO 9001:2008 registered laboratory that performed the tests in Example 4. For PAH level determination, the samples were subjected to one hour ultrasonic extraction with toluene at 60° C. A control sample of untreated crumb rubber and a test sample of the crumb rubber that was mixed with a blend of turpentine fluids containing α-terpineol, β-terpineol, and β-pinene at 90° C. for 20 minutes were each tested by the same method. For the test sample, the crumb rubber was then separated from the turpentine liquids blend. The samples were each tested by the same ZEK method and the results of this testing is tabulated below.

| Name of PAH | Control Sample Concentration (mg/kg) | Test Sample Concentration (mg/kg) |
| --- | --- | --- |
| Acenaphthene | BRL | BRL |
| Acenaphthylene | BRL | BRL |
| Anthracene | BRL | BRL |
| Benzo[a]anthracene | BRL | BRL |
| Benzo[a]pyrene | BRL | BRL |
| Benzo[b]fluoranthene | BRL | BRL |
| Benzo[ghi]perylene | BRL | BRL |
| Benzo[k]fluoranthene | BRL | BRL |
| Chrysene | BRL | BRL |
| Dibenzo[a,h]anthracene | BRL | BRL |
| Fluoranthene | 2.5 | BRL |
| Fluorene | BRL | BRL |
| Indeno[1,2,3-cd]pyrene | BRL | BRL |
| Naphthalene | BRL | BRL |
| Phenanthrene | 1.7 | BRL |
| Pyrene | 7.3 | 1.5 |
| TOTAL | 11.5 | 1.5 |
| Detection (Reporting) Limit | ≤0.2 | ≤0.2 |

Example 6: Extraction of the Turpentine Fluid from PAH-Reduced Rubber

To remove turpentine fluid trapped within the pores of the PAH-reduced rubber sample, the rubber sample was mixed with isopropyl alcohol (IPA) at a 1:1 mass ratio under ambient pressure and at about 15° C. for about 5 minutes. The mixing procedure was repeated twice such that the amount of turpentine fluid remaining in the pores of the rubber sample was reduced from 200 wt. % to essentially nil (0.001 wt. % of the rubber).

Example 7: Use of a PAH-Reduced Rubber for Producing Consumer Products

Recycle rubber that was treated the PAH-extracting composition of the invention to reduce PAH levels was used in the manufacture of shoe soles and hockey pucks by making a 50/50 mixture of the recycled rubber and virgin rubber and molding. The molding was done by conventional means. A comparison of the quality of the shoe soles and hockey pucks made using 100% virgin rubber to the 50% recycled and PAH-reduced rubber mixture surprisingly revealed essentially no detriment to quality. Thus, an appreciable cost savings, environmental benefit, and increase in safety are obtained from the invention.

The results for the reduction of PAH levels in PAHs-containing materials described in the specification, and especially in the Examples above, were unexpected. Surprising advantages were realized in processing or recycling materials containing unacceptably high levels of harmful PAHs into safe and useful new products and raw materials through practicing the claimed invention.

As used herein, the terms about and approximately should be interpreted to include any values which are within 5% of the recited value. Furthermore, recitation of the term about and approximately with respect to a range of values should be interpreted to include both the upper and lower end of the recited range. As used herein, the terms first, second, third and the like should be interpreted to uniquely identify elements and do not imply or restrict to any particular sequencing of elements or steps.

While the invention has been shown or described in only some of its embodiments, it should be apparent to those skilled in the art that it is not so limited, but is susceptible to various changes without departing from the spirit and scope of the invention.

The invention claimed is:
1. A method for extracting, reducing and/or removing a harmful polycyclic aromatic hydrocarbon (PAH) from a PAH-containing material selected from water, oils, plants, wood, fats, rubber, plastics, or consumer goods that contain a PAH to obtain a material from which said PAH has been separated comprising the steps of:
   a) providing a liquid PAH-extracting composition comprising a turpentine liquid selected from the group consisting of natural turpentine, synthetic turpentine, mineral turpentine, pine oil, alpha-pinene, beta-pinene, alpha-terpineol, beta-terpineol, gamma-terpineol, 3-carene, anethole, dipentene (p-mentha-1,8-diene), terpene resins, alpha-terpene, beta-terpene, gamma terpene, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof,
b) contacting said PAH-containing material selected from water, oils, plants, wood, fats, rubber, plastics, or consumer goods that contain a PAH with said liquid PAH-extracting composition such that an extraction mixture is formed, and a residual material is formed of material from the PAH-containing material that is not soluble in the liquid PAH-extracting composition, wherein the extraction mixture comprises at least a portion of said PAH extracted into and dissolved in the turpentine liquid,
c) separating the turpentine liquid from said residual material, and
d) after step c, removing the turpentine liquid from the residual material using methanol, ethanol, propanol, isopropanol, butanol, isobutanol, pentanol, hexanol, or a mixture thereof.

2. The method of claim 1, wherein said liquid PAH-extracting composition further comprises a fluid selected from Dimethyl Sulfoxide (DMSO), 2-ethoxyethanol, alkanes, aliphatic amines, aromatic amines, carbon bisulfide, vegetable oils, solvents manufactured in petroleum refining, dry distilling coal, fractionating liquefied coal, and fractionating extracted hydrocarbons from oil sands and oil shale, or a mixture thereof.

3. The method of claim 2, wherein the ratio of turpentine liquid in the liquid PAH-extracting composition to the fluid selected from Dimethyl Sulfoxide (DMSO), 2-ethoxyethanol, alkanes, aliphatic amines, aromatic amines, carbon bisulfide, vegetable oils, solvents manufactured in petroleum refining, dry distilling coal, fractionating liquefied coal, and fractionating extracted hydrocarbons from oil sands and oil shale, or a mixture thereof is greater than or equal to about 1:1 by volume.

4. The method of claim 1, wherein said PAH-containing material is contacted with said liquid PAH-extracting composition in a ratio range of about 1:6 to about 4:1 by weight.

5. The method of claim 4, wherein the PAH-containing containing material is contacted with said liquid PAH-extracting composition in a ratio of about 1:4 to about 2:1 by weight.

6. The method of claim 5, wherein the PAH-containing material is contacted with said liquid PAH-extracting composition in a ratio of about 1:3 to about 1:1 by weight.

7. The method of claim 1, wherein said contacting is carried out at a temperature within the range of about 2° C. to about 400° C.

8. The method of claim 1, wherein said contacting is carried out at a temperature within the range of about 15° C. to about 150° C.

9. The method of claim 1, wherein said contacting is carried out at a temperature within the range of about 90° C. to about 120° C.

10. The method of claim 1, wherein said PAH-containing material is contacted with said liquid PAH-extracting composition for about 1 to about 300 minutes.

11. The method of claim 1, wherein said PAH-containing material is contacted with said liquid PAH-extracting composition for about 15 to about 90 minutes.

12. The method of claim 1, wherein said contacting step is repeated about 1 to about 10 times.

13. The method of claim 1, wherein said liquid PAH-extracting composition comprises at least 50% of a turpentine fluid or mixture of turpentine fluids.

14. The method of claim 1, wherein said liquid PAH-extracting composition comprises at least 90% of a turpentine fluid or mixture of turpentine fluids.

15. The method of claim 1, wherein said contacting extracts at least about 80% of PAH contained within said PAH-containing material before said contacting.

16. The method of claim 1, wherein said contacting extracts at least about 95% of PAH contained within said PAH-containing material before said contacting.

17. The method of claim 1, wherein said turpentine fluid is selected from the group consisting of alpha-terpineol, beta-terpineol, gamma-terpineol, 3-carene, anethole, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof.

18. The method of claim 1, wherein the liquid PAH-extracting composition is surfactant free.

19. The method of claim 1, wherein the liquid PAH-extracting composition is non-aqueous.

20. A method for removing a harmful polycyclic aromatic hydrocarbon (PAH) from a PAH-containing material selected from oils, plants, wood, fats, rubber, plastics, or consumer goods that contain a PAH to obtain a material from which said PAH has been removed comprising the steps of:
a) providing a liquid PAH-extracting composition comprising a turpentine liquid,
b) contacting said PAH-containing material selected from oils, plants, wood, fats, rubber, plastics, or consumer goods that contain a PAH with said liquid PAH-extracting composition such that an extraction mixture is formed, and a residual material is formed of material from the PAH-containing material that is not soluble in the liquid PAH-extracting composition, wherein the extraction mixture comprises at least a portion of said PAH extracted into and dissolved in the turpentine liquid,
c) separating the turpentine liquid from said residual material, and
d) after step c, removing the turpentine liquid from the residual material using methanol, ethanol, propanol, isopropanol, butanol, isobutanol, pentanol, hexanol, or a mixture thereof.

* * * * *